US011664698B2

United States Patent
Uchino et al.

(10) Patent No.: US 11,664,698 B2
(45) Date of Patent: May 30, 2023

(54) MOTOR AND BLOWER

(71) Applicant: Nidec Corporation, Kyoto (JP)

(72) Inventors: Takashi Uchino, Kyoto (JP); Yukinobu Shiraishi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 81 days.

(21) Appl. No.: 17/015,901

(22) Filed: Sep. 9, 2020

(65) Prior Publication Data
US 2021/0095687 A1    Apr. 1, 2021

(30) Foreign Application Priority Data

Sep. 26, 2019  (JP) .............................. JP2019-176169

(51) Int. Cl.
F04D 25/08     (2006.01)
F04D 29/28     (2006.01)
F04D 25/06     (2006.01)
F04D 19/00     (2006.01)
H02K 5/04      (2006.01)

(52) U.S. Cl.
CPC ......... F04D 29/281 (2013.01); F04D 19/002 (2013.01); F04D 25/06 (2013.01); F04D 25/08 (2013.01); H02K 5/04 (2013.01)

(58) Field of Classification Search
CPC ...... F04D 25/0613; F04D 29/40; F04D 29/60; F04D 29/403; F04D 29/406; H02K 15/14; H02K 15/028
See application file for complete search history.

(56) References Cited

U.S. PATENT DOCUMENTS

| 6,380,651 B1 * | 4/2002 | Yamaguchi | F16C 17/026 310/67 R |
| 6,479,914 B2 * | 11/2002 | Yoshida | H02K 7/063 310/156.38 |
| 6,713,907 B2 * | 3/2004 | Matsumoto | F04D 25/0613 310/254.1 |

(Continued)

FOREIGN PATENT DOCUMENTS

| JP | 2014-051902 A | 3/2014 | |
| WO | WO-2019154556 A1 * | 8/2019 | ............. H02K 11/33 |

OTHER PUBLICATIONS

Twikl.com webpage for polygon, URL: https://www.twinkl.com/teaching-wiki/polygon, downloaded Nov. 30, 2021 (Year: 2021).*

(Continued)

Primary Examiner — Thomas Fink
(74) Attorney, Agent, or Firm — Keating & Bennett

(57) ABSTRACT

A motor including a rotating portion that is rotatable about a center axis that extends vertically and a stationary portion that rotatably supports the rotating portion. The stationary portion includes a stator facing at least a portion of the rotating portion in a radial direction, a base disposed axially below the stator, and a resin portion covering at least a portion of the stator, connecting the stator and the base. The base includes a recessed portion that is recessed downward in an axial direction and that accommodates at least a portion of the resin portion. The recessed portion includes an inner peripheral surface provided with an upper wall portion disposed axially above a portion of the resin portion.

7 Claims, 6 Drawing Sheets

(56) References Cited

U.S. PATENT DOCUMENTS

| | | | | |
|---|---|---|---|---|
| 7,944,103 | B2* | 5/2011 | Nomura | H02K 1/187 |
| | | | | 310/90 |
| 8,192,157 | B2* | 6/2012 | Horng | F04D 29/522 |
| | | | | 415/203 |
| 9,062,567 | B2* | 6/2015 | Kaji | F01D 25/162 |
| 9,887,602 | B2* | 2/2018 | Shen | H02K 5/1672 |
| 10,615,675 | B2* | 4/2020 | Aoi | H02K 15/02 |
| 2004/0189113 | A1* | 9/2004 | Kuribara | H02K 11/33 |
| | | | | 310/67 R |
| 2007/0196208 | A1* | 8/2007 | Takemoto | F04D 29/542 |
| | | | | 415/220 |
| 2009/0021087 | A1* | 1/2009 | Kitamura | H02K 1/187 |
| | | | | 310/43 |
| 2009/0047148 | A1* | 2/2009 | Chen | F04D 29/056 |
| | | | | 417/354 |
| 2012/0121426 | A1* | 5/2012 | Kitamura | H02K 5/08 |
| | | | | 416/197 R |
| 2012/0269665 | A1* | 10/2012 | Takeshita | F04D 29/053 |
| | | | | 417/420 |
| 2015/0226225 | A1* | 8/2015 | Adachi | F04D 25/0613 |
| | | | | 417/423.12 |

OTHER PUBLICATIONS

Wikipedia.com page for polygon, URL: https://en.wikipedia.org/wiki/Polygon, downloaded Nov. 30, 2021 (Year: 2021).*

* cited by examiner

[Fig. 1]
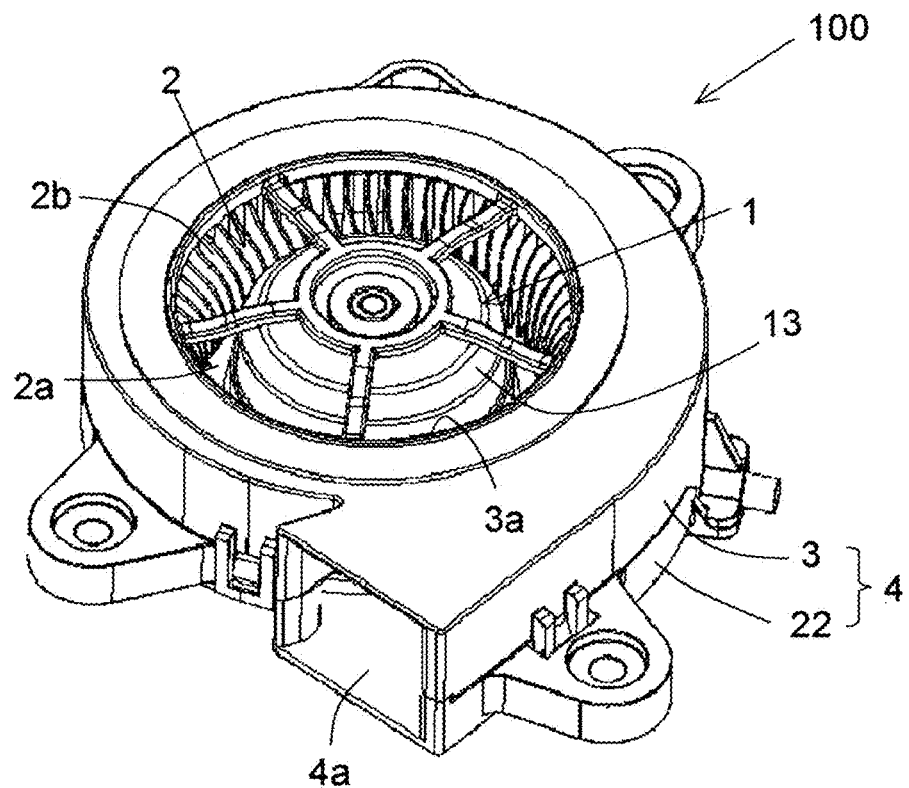
[Fig. 2]
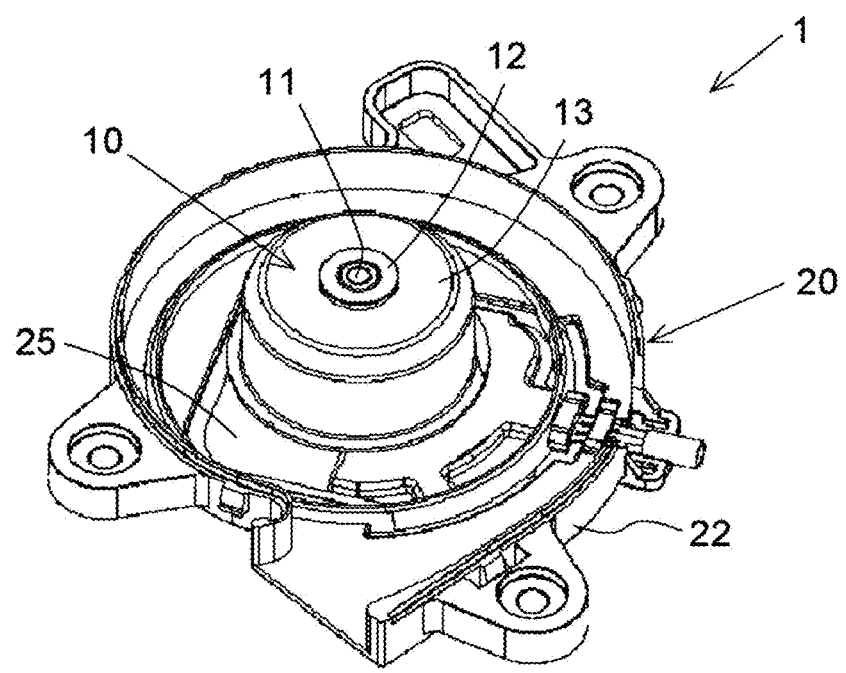

[Fig. 3]
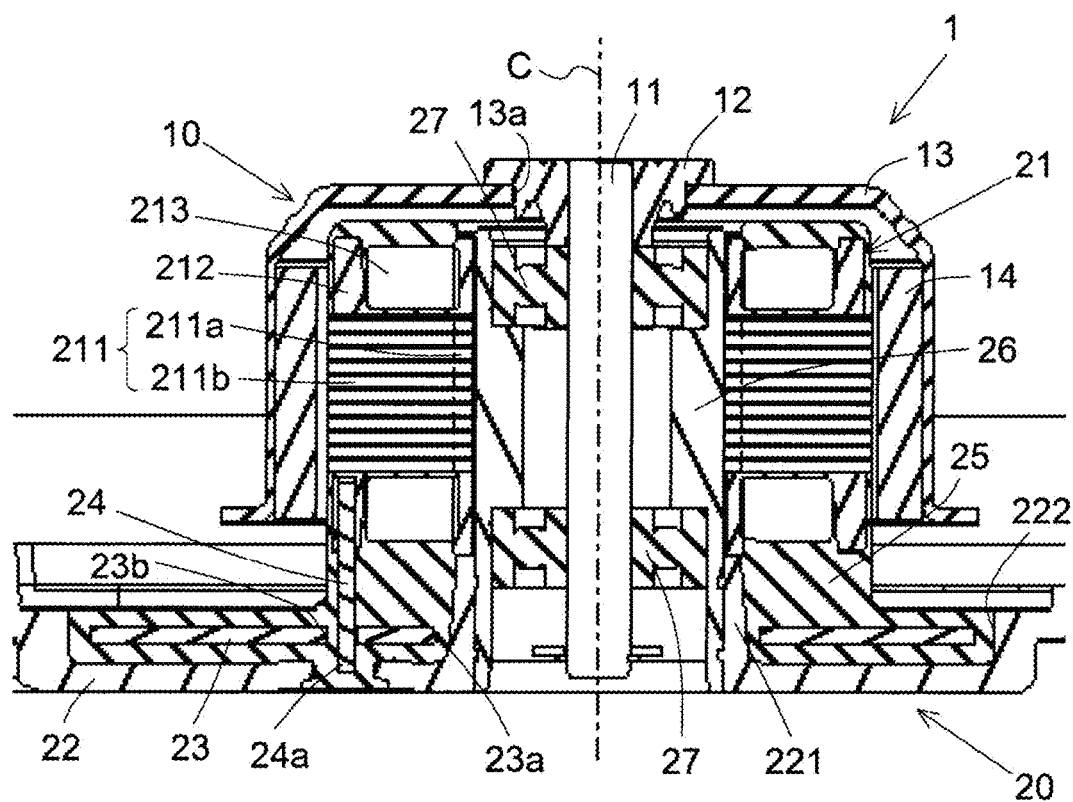

[Fig. 4]
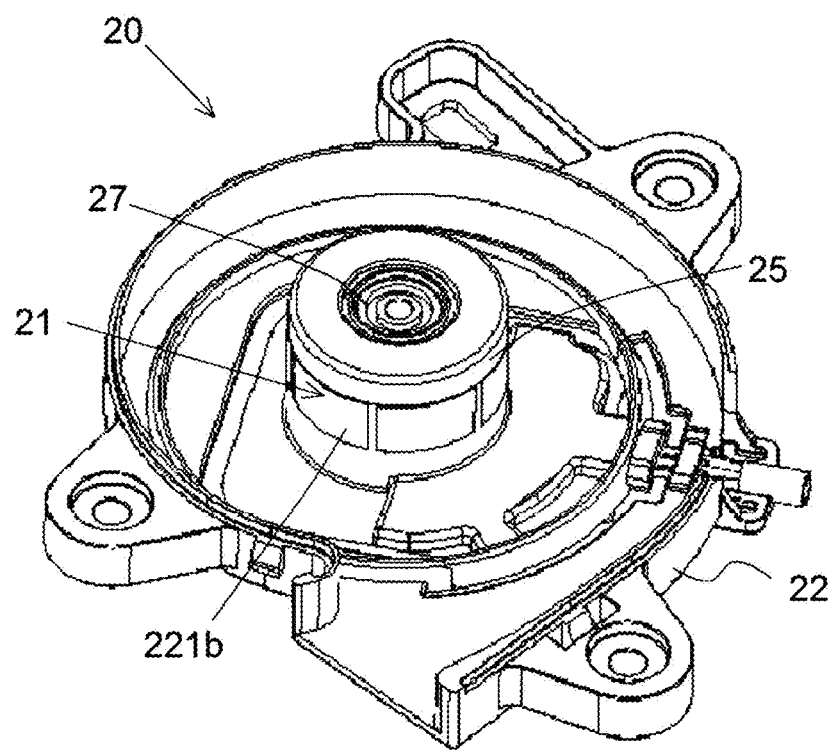

【Fig. 5】
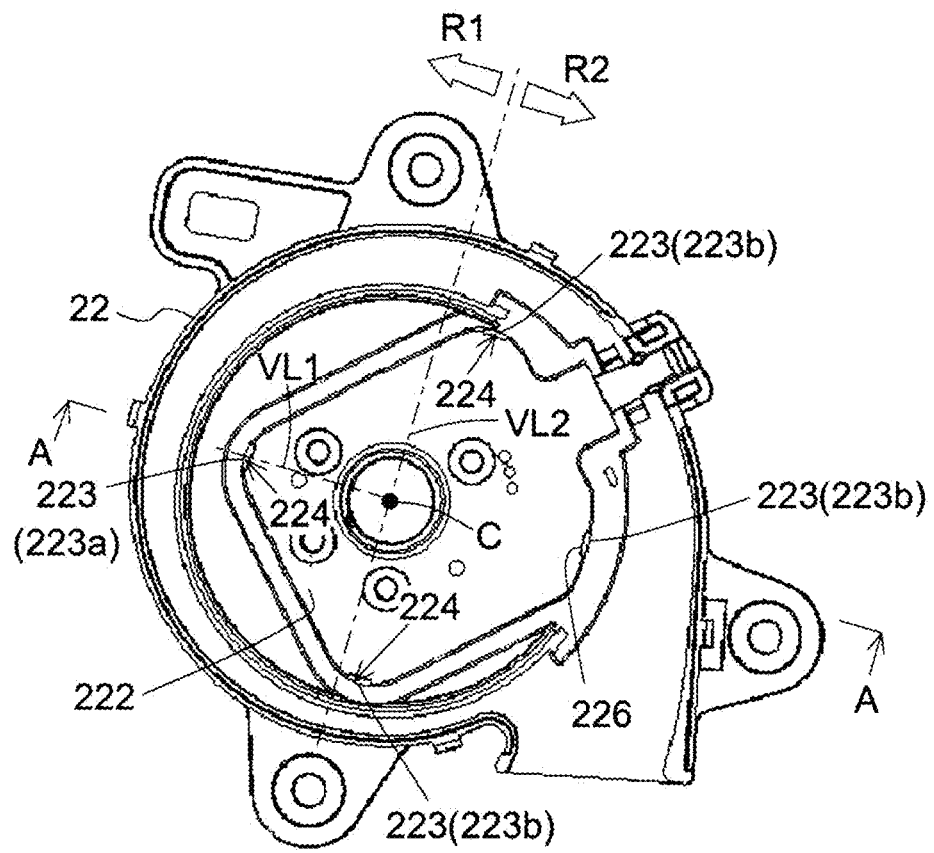
【Fig. 6】
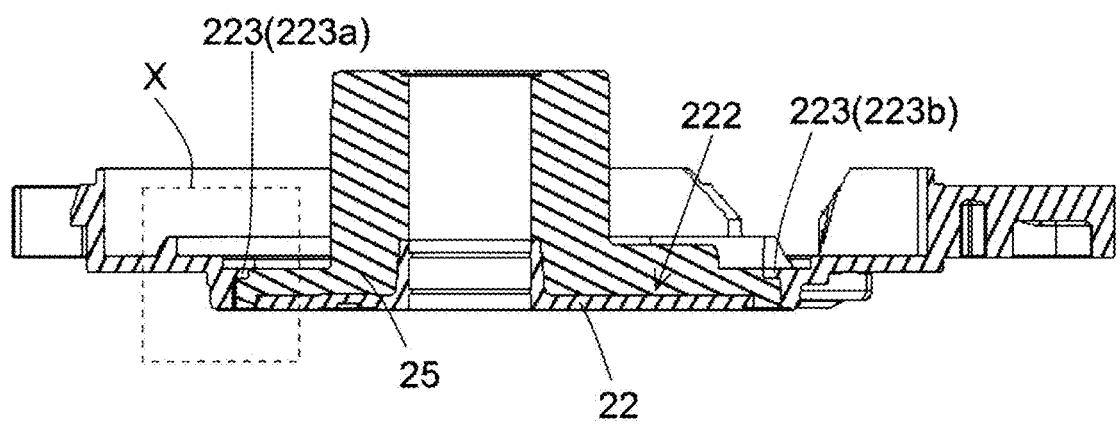

【Fig. 7】
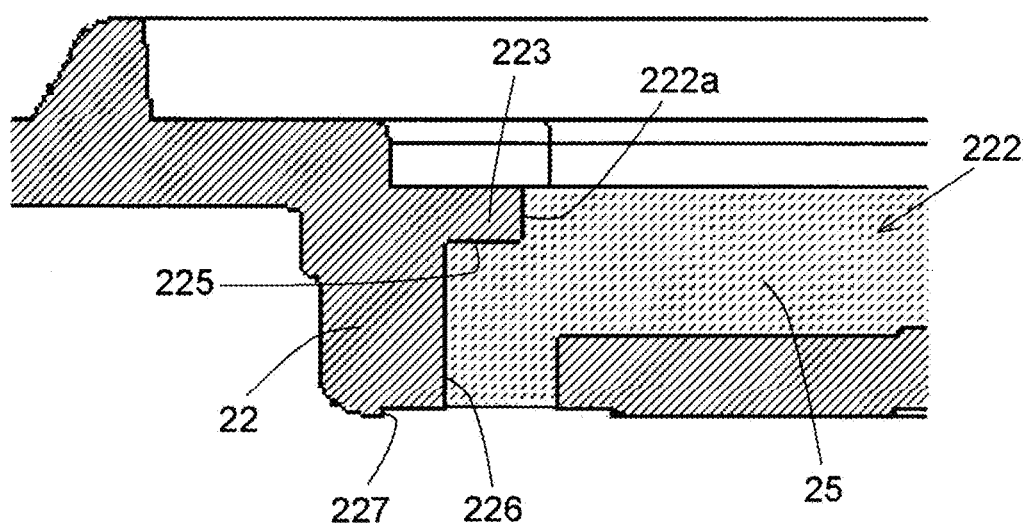
【Fig. 8】
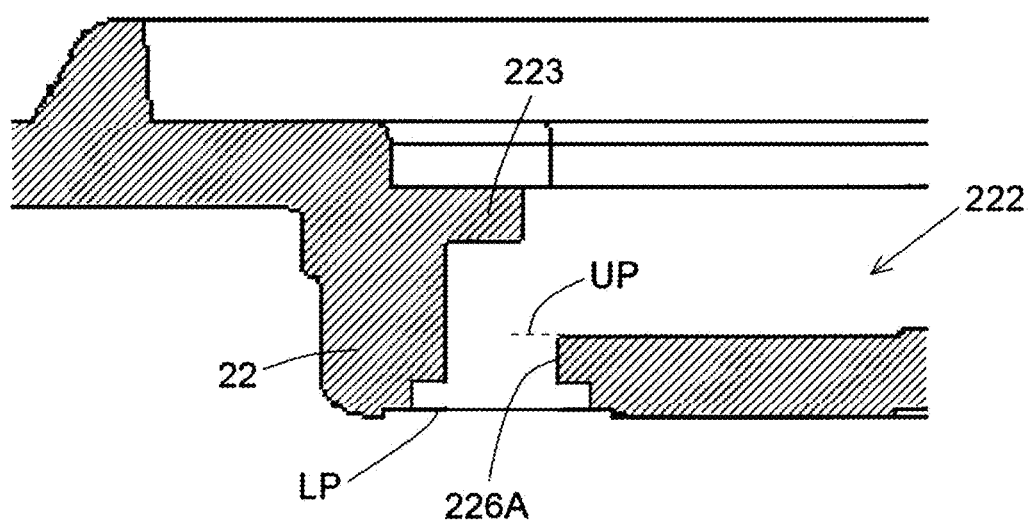

[Fig. 9]
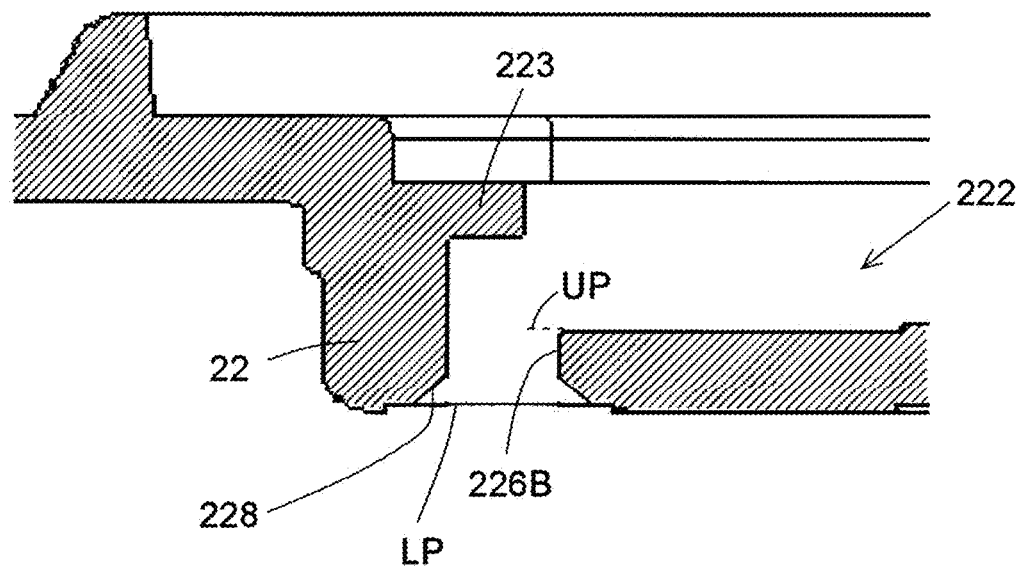
[Fig. 10]
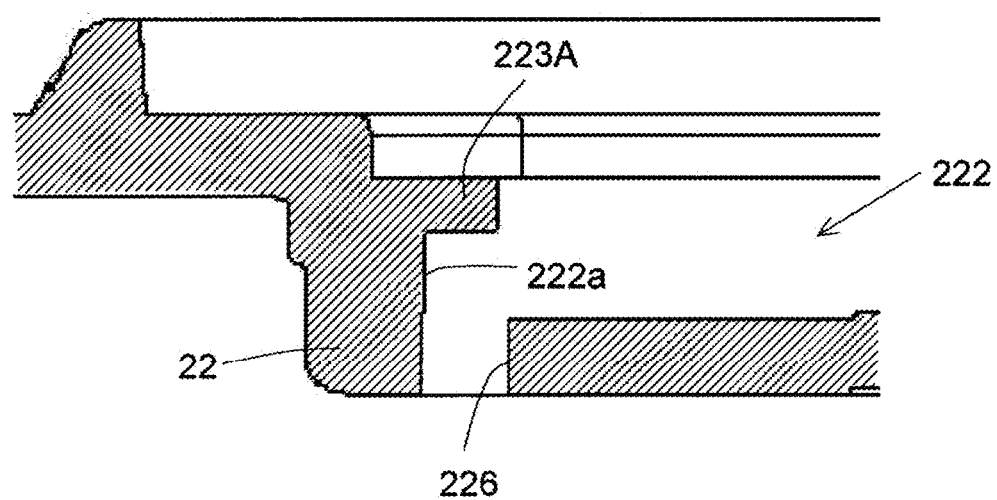

MOTOR AND BLOWER

CROSS REFERENCE TO RELATED APPLICATION

The present application claims priority under 35 U.S.C. § 119 to Japanese Application No. 2019-176169 filed on Sep. 26, 2019, the entire contents of which are hereby incorporated herein by reference.

FIELD OF THE INVENTION

The present disclosure relates to a motor and a blower.

BACKGROUND

Conventionally, a motor having a resin-molded stator has been known. The stator has, for example, a structure including a core and a winding wire that are disposed around a cylindrical housing that houses a rotating shaft, and a lead wire connected to the winding wire, all of which being molded with a resin such as an epoxy resin. When a cover is mounted on the stator molded with the resin as described above, the cover is fixed to the stator with a screw.

The structure in which the stator and a member such as the cover are attached with a screw causes increase in cost of material due to use of the screw. The structure also causes concern that the number of manufacturing processes will increase due to work of screwing. In contrast, fixing without using a fixing tool such as a screw causes concern that the stator may be insufficiently fixed to a member to be fixed to the stator.

SUMMARY

A motor according to an example embodiment of the present disclosure includes a rotating portion that is rotatable about a center axis that extends vertically and a stationary portion that rotatably supports the rotating portion. The stationary portion includes a stator facing at least a portion of the rotating portion in a radial direction, a base disposed axially below the stator, and a resin portion covering at least a portion of the stator, connecting the stator and the base. The base includes a recessed portion that is recessed downward in an axial direction and that accommodates at least a portion of the resin portion. The recessed portion includes an inner peripheral surface provided with an upper wall portion disposed axially above a portion of the resin portion.

A blower according to an example embodiment of the present disclosure includes a motor according to an example embodiment of the present disclosure, and an impeller that is rotatable together with the rotating portion.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a perspective view of a blower according to an example embodiment of the present disclosure.

FIG. 2 is a perspective view of a motor according to an example embodiment of the present disclosure.

FIG. 3 is a schematic longitudinal sectional view of a motor according to an example embodiment of the present disclosure.

FIG. 4 is a perspective view of a stationary part included in a motor according to an example embodiment of the present disclosure.

FIG. 5 is a plan view of a base included in a motor according to an example embodiment of the present disclosure.

FIG. 6 is a longitudinal sectional view of a base and a resin portion taken along line A-A of FIG. 5.

FIG. 7 is an enlarged view in which a portion surrounded by a broken line frame in FIG. 6 is enlarged.

FIG. 8 is a view for illustrating a first modification of a motor according to an example embodiment of the present disclosure.

FIG. 9 is a view for illustrating a second modification of a motor according to an example embodiment of the present disclosure.

FIG. 10 is a view for illustrating a third modification of a motor according to an example embodiment of the present disclosure.

DETAILED DESCRIPTION

Hereinafter, example embodiments of the present disclosure will be described in detail with reference to the drawings. The present specification describes a blower 100 and a motor 1 with directions with respect to a center axis C of the motor 1 illustrated in FIG. 3, the directions including: a direction parallel to the center axis C that is referred to as an "axial direction", "axial", or "axially"; a direction orthogonal to the center axis C that is referred to as a "radial direction", "radial", or "radially"; and a direction along a circular arc about the center axis C that is referred to as a "circumferential direction", "circumferential", or "circumferentially". The present specification also describes a shape and a positional relationship of each part with the axial direction as a vertical direction with a lower side on which a base 22 is provided with respect to a stator 21. However, this definition of the vertical direction does not intend to limit a direction of each of the blower 100 and the motor 1 according to the present disclosure at the time of use.

FIG. 1 is a perspective view of the blower 100 according to an example embodiment of the present disclosure. The blower 100 of the present example embodiment is a centrifugal fan. However, the blower to which the present disclosure is applied is not limited to the centrifugal fan, and may be, for example, an axial fan or a turbo fan. As illustrated in FIG. 1, the blower 100 includes the motor 1 and an impeller 2. The blower 100 further includes a fan cover 3. Details of the motor 1 will be described later.

The impeller 2 is driven by the motor 1 to rotate about the center axis C. The impeller 2 includes an impeller annular portion 2a and a plurality of blade portions 2b. The impeller 2 is made of resin, for example. In the present example embodiment, the impeller annular portion 2a and the plurality of blade portions 2b constitute a single member. However, the impeller annular portion 2a and the plurality of blade portions 2b may be separate members.

The impeller annular portion 2a has an annular shape about the center axis C. The impeller annular portion 2a is attached to a rotating part 10 of the motor 1 described later. That is, the impeller 2 rotates together with the rotating part 10. At least a part of each blade portion 2b is disposed on an axially upper surface of the impeller annular portion 2a. Each blade portion 2b extends from the impeller annular portion 2a in a direction away from the center axis C. The direction away from the center axis C may be parallel to the radial direction or may be a direction inclined with respect to the radial direction. The plurality of blade portions 2b is disposed at intervals in the circumferential direction. In the present example embodiment, the plurality of blade portions 2b is disposed at equal intervals in the circumferential direction.

The fan cover 3 constitutes a housing 4 of the blower 100 in combination with the base 22 of the motor 1 described later. The fan cover 3 is provided with a cover through-hole 3a in a circular shape about the center axis C in plan view in the axial direction, the cover through-hole 3a passing through the fan cover 3 in the axial direction.

The blower 100 is configured such that driving of the motor 1 causes the impeller 2 to rotate to allow air to flow into the housing 4 from the outside through the cover through-hole 3a. The air having flowed into the housing 4 flows in a direction away from the center axis C along the plurality of blade portions 2b and blows out to the outside from a housing opening 4a provided in the housing 4. As described later, the stator 21 of the motor 1 can be fixed with a simple structure. That is, the blower 100 can achieve reduction in manufacturing cost and work load.

FIG. 2 is a perspective view of the motor 1 according to an example embodiment of the present disclosure. FIG. 3 is a schematic longitudinal sectional view of the motor 1 according to an example embodiment of the present disclosure. As illustrated in FIGS. 2 and 3, the motor 1 includes the rotating part 10 and a stationary part 20.

The rotating part 10 rotates about the center axis C extending vertically. The rotating part 10 includes a shaft 11, a bush 12, a rotor holder 13, and a magnet 14.

The shaft 11 is a columnar member disposed along the center axis C. As a material of the shaft 11, for example, a metal such as stainless steel is used. In the present example embodiment, the shaft 11 rotates about the center axis C. However, the shaft 11 may be configured to be fixed to the base 22 or the like in a non-rotating manner. That is, the rotating part 10 may not include the shaft 11.

The bush 12 has a tubular shape extending in the axial direction. The shaft 11 has an upper end accommodated in the bush 12, and the bush 12 is fixed to the upper end of the shaft 11.

The rotor holder 13 opens downward in the axial direction and has a cylindrical shape with a lid. The rotor holder 13 has an upper wall provided in its central portion with a rotor holder through-hole 13a passing through the upper wall in the axial direction. The rotor holder through-hole 13a has a circular shape about the center axis C in plan view in the axial direction. The bush 12 is accommodated in the rotor holder through-hole 13a, and the bush 12 is fixed to the rotor holder 13. That is, the rotor holder 13 is provided in a rotatable manner about the center axis C together with the shaft 11.

The rotor holder 13 is fitted in the impeller annular portion 2a, and the impeller 2 is fixed to the rotor holder 13. That is, the impeller 2 rotates with rotation of the rotor holder 13.

The magnet 14 is fixed to a radially inner surface of a side wall constituting a lateral surface of the rotor holder 13. In the present example embodiment, the magnet 14 is a single annular magnet. The magnet 14 has a radially inner surface on which N poles and S poles are alternately disposed in the circumferential direction. However, instead of a single annular magnet, a plurality of magnets may be disposed on the radially inner surface of the side wall constituting the lateral surface of the rotor holder 13. In this case, the plurality of magnets has N poles and S poles that are alternately disposed in the circumferential direction.

The stationary part 20 rotatably supports the rotating part 10. FIG. 4 is a perspective view of the stationary part 20 included in the motor 1 according to an example embodiment of the present disclosure. FIG. 4 is a view in which the rotating part is removed from the motor 1 illustrated in FIG. 2. As illustrated in FIGS. 2 to 4, the stationary part 20 includes the stator 21, the base 22, and a resin portion 25. The stationary part 20 further includes a circuit board 23, a conductive member 24, a bearing holder 26, and a bearing 27.

The stator 21 is an armature that generates a magnetic flux in accordance with a drive current. The stator 21 faces at least a part of the rotating part 10 in the radial direction. In the present example embodiment, the stator 21 faces a part of the rotating part 10 in the radial direction. The stator 21 is disposed radially inward of a part of the rotating part 10. Specifically, the stator 21 includes a stator core 211, an insulator 212, and a coil 213.

The stator core 211 is a magnetic body. For example, the stator core 211 is formed by layering electromagnetic steel plates. The magnet 14 is disposed radially outward of the stator core 211 at an interval in the radial direction. The stator core 211 includes a core back 211a in an annular shape about the center axis C and a plurality of teeth 211b extending radially outward from the core back 211a. The plurality of teeth 211b is disposed at intervals in the circumferential direction.

The insulator 212 is an insulating body. As a material of the insulator 212, for example, resin may be used. In the present example embodiment, at least a part of the stator core 211 is covered with the insulator 212. Each of the teeth 211b has a radially outer surface exposed without being covered with the insulator 212. The radially outer surface of each of the teeth 211b faces the magnet 14 at an interval in the radial direction.

The coil 213 is formed by winding a conductive wire around each of the teeth 211b with the insulator 212 interposed therebetween. That is, the stator 21 includes a plurality of the coils 213.

The base 22 is disposed axially below the stator 21. In the present example embodiment, the base 22 is made of resin. However, the base 22 may be made of a material other than resin such as metal. The base 22 is provided in its central portion with a base tubular portion 221 about the center axis C, extending in the axial direction. The base 22 includes a recessed portion 222 that is recessed downward in the axial direction and that accommodates at least a part of the resin portion 25. The recessed portion 222 is provided in an axially upper surface of the base 22. In the present example embodiment, the recessed portion 222 accommodates a part of the resin portion 25. The recessed portion 222 has an inner peripheral surface disposed radially outward of the base tubular portion 221. The resin portion 25 is partly accommodated between the inner peripheral surface of the recessed portion 222 and the base tubular portion 221 in the radial direction.

In the present example embodiment, the inner peripheral surface of the recessed portion 222 has a polygonal shape in plan view in the axial direction. The inner peripheral surface of the recessed portion 222 may have a shape other than a polygonal shape, such as a circular shape or an elliptical shape in plan view in the axial direction.

The circuit board 23 is disposed between the stator 21 and the base 22 in the axial direction. The circuit board 23 is accommodated in the recessed portion 222. The circuit board 23 includes an electric circuit for supplying a drive current to the coil 213. The circuit board 23 has an axially upper surface on which various electric components are mounted. The circuit board 23 is provided with a first circuit board through-hole 23a that passes through the circuit board 23 in the axial direction and through which the base tubular portion 221 passes. The circuit board 23 is also provided with a second circuit board through-hole 23b that passes through the circuit board 23 in the axial direction and through which the conductive member 24 passes.

The conductive member 24 is electrically connected to each of the coil 213 and the circuit board 23. In the present example embodiment, the conductive member 24 has the shape of a pin extending in the axial direction. Specifically, the conductive member 24 is a terminal pin in a prismatic shape. The terminal pin may have another columnar shape such as a cylindrical columnar shape. The conductive member 24 is fixed to the insulator 212. The conductive member 24 is entangled with a conducting wire drawn from the coil 213. The conductive member 24 has an axially lower portion that partly extends axially downward from the circuit board 23 through the second circuit board through-hole 23b. That is, the conductive member 24 includes an extending portion 24a extending axially downward from the circuit board 23. The conductive member 24 is fixed to the circuit board 23 by solder (not illustrated) on an axially lower side of the circuit board 23. In the present example embodiment, the stationary part 20 includes a plurality of the conductive members 24. Specifically, four conductive members 24 are provided. However, the number of the conductive members 24 may be changed as appropriate.

The conductive member 24 does not need to have the shape of a pin as long as it has a portion extending in the axial direction, and may be, for example, a flat terminal extending in the axial direction. The conductive member 24 only needs to be electrically connected to the coil 213, and may be, for example, welded.

The resin portion 25 is configured to cover at least a part of the stator 21. In the present example embodiment, a part of the stator 21 is covered with the resin portion 25. The radially outer surface of each of the teeth 211b is exposed from the resin portion 25. The resin portion 25 is also configured to cover the circuit board 23 and the conductive member 24. The resin constituting the resin portion 25 is accommodated in the recessed portion 222 accommodating the circuit board 23 to cover the circuit board 23. The resin constituting the resin portion 25 is also poured along a shape of a mold temporarily disposed on the axially upper surface of the base 22 during manufacturing to cover the stator 21 and the conductive member 24.

The resin portion 25 covering the stator 21, the circuit board 23, and the conductive member 24 is integrally connected and formed. The resin portion 25 connects the stator 21 and the base 22. The stator 21 and the base 22 are mechanically connected by the resin portion 25. The resin portion 25 is made of a hot melt resin, for example. The resin portion 25 is connected to the base 22 without being separated from the base 22.

The bearing holder 26 has a cylindrical shape about the center axis C. The bearing holder 26 holds the bearing 27 disposed radially inward of the holder. The bearing holder 26 is fitted into the base tubular portion 221 to be fixed to the base 22. The bearing holder 26 is disposed radially inward of the stator core 211. The stator core 211 is fixed to the bearing holder 26. That is, the stator 21 is supported by the base 22.

The bearing 27 is disposed radially outward of the shaft and radially inward of the bearing holder 26 to rotatably support the shaft 11. In the present example embodiment, two bearings 27 are provided, and the two bearings 27 are disposed at an interval in the axial direction. The two bearings 27 are each a ball bearing. However, the bearings 27 may be changed in number and type appropriately, and may be each a sleeve bearing or the like, for example.

In the motor 1, supplying a drive current to the coil 213 generates rotational torque between the magnet 14 and the stator 21. This causes the rotor holder 13 to rotate around the stator 21. When the rotor holder 13 rotates, the impeller 2 fixed to the rotor holder 13 also rotates about the center axis C. The motor 1 of the present example embodiment is an outer rotor type motor in which the magnet 14 constituting the rotating part 10 is disposed radially outward of the stator 21. However, the motor to which the present disclosure is applied may be an inner rotor type motor in which a magnet constituting a rotating part is disposed radially inward of a stator.

FIG. 5 is a plan view of the base 22 included in the motor 1 according to an example embodiment of the present disclosure. FIG. 6 is a longitudinal sectional view of the base 22 and the resin portion 25 taken along line A-A of FIG. 5. FIG. 7 is an enlarged view in which a portion surrounded by a broken line frame X in FIG. 6 is enlarged.

As illustrated in FIGS. 5, 6 and 7, the recessed portion 222 has an inner peripheral surface 222a provided with an upper wall portion 223 disposed axially above a part of the resin portion 25. Specifically, the upper wall portion 223 is in contact with the resin portion 25. In the present example embodiment, the upper wall portion 223 has an axially lower surface and a radially inner surface that are in contact with the resin portion 25.

According to this structure, a part of the resin portion 25 is disposed axially below the upper wall portion 223. Thus, this structure enables preventing the stator 21 covered with the resin portion 25 from coming off from the base 22 axially upward together with the resin portion 25 when the resin constituting the resin portion 25 accommodated in the recessed portion 222 peels off from the base 22. That is, according to this structure, the stator 21 can be fixed to the base 22 with a simple structure without using a screw for fixing.

In the present example embodiment, as illustrated in FIG. 7, the upper wall portion 223 is provided at an axially upper end of the inner peripheral surface 222a of the recessed portion 222. The upper wall portion 223 may be provided between the axially upper end of the inner peripheral surface 222a of the recessed portion 222 and an axially lower end thereof. However, when the upper wall portion 223 is provided at the axially upper end of the inner peripheral surface 222a of the recessed portion 222 as in the present example embodiment, the resin constituting the resin portion 25 disposed axially below the upper wall portion 223 can be increased in thickness to improve strength of the resin portion 25. As a result, this enables reducing the possibility that the stator 21 covered with the resin portion 25 comes off in an axially upward direction.

In the present example embodiment, as illustrated in FIG. 5, a plurality of upper wall portions 223 including the upper wall portion 223 is provided in a direction along the inner peripheral surface 222a of the recessed portion 222 in plan view in the axial direction. In the present example embodiment, the inner peripheral surface 222a of the recessed portion 222 has a linear shape that surrounds the center axis C in plan view in the axial direction. Increasing the number of the upper wall portions 223 enables reducing the possibility that the stator 21 covered with the resin portion 25 comes off in the axially upward direction. Specifically, the plurality of upper wall portions 223 is disposed at intervals in the direction along the inner peripheral surface of the recessed portion 222 in plan view in the axial direction.

In the present example embodiment, the number of the upper wall portions 223 is four. The number of the upper wall portions 223 may be other than four. The number of the upper wall portions 223 may be singular. When the number of the upper wall portions 223 is singular, the upper wall portion 223 may be provided in, for example, an annular shape or a C-shape in the direction along the inner peripheral surface of the recessed portion 222 in plan view in the axial direction. In the present example embodiment, all of the plurality of upper wall portions 223 are provided on the axially upper end of the inner peripheral surface 222a of the recessed portion 222. However, axial height positions of the plurality of upper wall portions 223 may be different from each other among at least some of the upper wall portions 223. The plurality of upper wall portions 223 may be disposed at intervals in the axial direction.

In the present example embodiment, the plurality of upper wall portions 223 includes a first upper wall portion 223a and a second upper wall portion 223b. The first upper wall portion 223a may be any one of the plurality of upper wall portions 223, including the second upper wall portion 223b satisfying the following relationship. In the present example embodiment, any of the four upper wall portions 223 can be the first upper wall portion 223a. In the example illustrated in FIG. 5, the first upper wall portion 223a is the upper wall portion 223 at a leftmost position of the four upper wall portions 223 in the drawing.

The second upper wall portion 223b is disposed in a region opposite to a region where the first upper wall portion 223a is disposed, across a second virtual line VL2 that passes through the center axis C and that is orthogonal to a first virtual line VL1, in plan view in the axial direction. The first virtual line VL1 is a virtual line connecting the center axis C and the first upper wall portion 223a in plan view in the axial direction. Specifically, the first virtual line VL1 is a virtual line connecting the center axis C and a predetermined position of the first upper wall portion 223a in plan view in the axial direction. In the example illustrated in FIG. 5, the predetermined position is the center position in the direction along the inner peripheral surface of the recessed portion 222 of the first upper wall portion 223a in plan view in the axial direction. However, the predetermined position is not limited to the center position described above, and may be, for example, one end in the direction along the inner peripheral surface of the recessed portion 222 of the first upper wall portion 223a in plan view in the axial direction.

In the example illustrated in FIG. 5, all the three upper wall portions 223 other than the first upper wall portion 223a are disposed in a region R2 opposite to a region R1 to which the first upper wall portion 223a belongs, across the second virtual line VL2. That is, in the example illustrated in FIG. 5, the three upper wall portions 223 other than the first upper wall portion 223a are each the second upper wall portion 223b. The example illustrated in FIG. 5 is exemplified as described above. At least one of the upper wall portions 223 other than the first upper wall portion 223a may correspond to the second upper wall portion 220b.

According to this structure, at least two of the plurality of upper wall portions 223 can be largely separated from each other in the direction along the inner peripheral surface of the recessed portion 222 in plan view in the axial direction, so that a fixed position of the resin portion 25 with the upper wall portion 223 can be prevented from being located at a specific place. This enables reducing the possibility that the stator 21 covered with the resin portion 25 comes off in the axially upward direction.

In the present example embodiment, at least one of the plurality of upper wall portions 223 is disposed at a corner portion 224 of the inner peripheral surface of the recessed portion 222 in plan view in the axial direction. As described above, the inner peripheral surface of the recessed portion 222 is in a polygonal shape in plan view in the axial direction and has corner portions 224. In the present example embodiment, three of the four upper wall portions 223 are disposed in the respective corner portions 224.

According to this structure, the upper wall portions 223 can be disposed at respective positions as distant from the center axis C as possible without any concentration of positions. At a position away from the center axis C, the resin portion 25 tends to peel off from the base 22 due to, for example, a large difference in contraction between members due to temperature change. The structure of the present example embodiment enables the resin portion 25 to be less likely to peel off from the base 22 by providing the upper wall portions 223 at the corresponding corner portions 224 where the resin portion 25 tends to easily peel off from the base 22.

In the present example embodiment, as illustrated in FIG. 7, the inner peripheral surface 222a of the recessed portion 222 is provided with a peripheral surface recessed portion 225 constituting the upper wall portion 223. The peripheral surface recessed portion 225 is recessed radially outward from the inner peripheral surface 222a of the recessed portion 222 below an upper end of the inner peripheral surface of the recessed portion 222. In other words, the upper wall portion 223 is formed by providing the inner peripheral surface 222a of the recessed portion 222 with the peripheral surface recessed portion 225 recessed radially outward. The peripheral surface recessed portion 225 is, for example, in a rectangular shape in plan view in the radial direction. In plan view in the axial direction, each upper wall portion 223 is provided on the inner peripheral surface of the recessed portion 222 within a range from a surface on one side in the circumferential direction constituting the peripheral surface recessed portion 225 to a surface on the other side. The peripheral surface recessed portion 225 accommodates a part of the resin portion 25. The peripheral surface recessed portion 225 is filled with the resin constituting the resin portion 25.

This structure enables increasing strength of the upper wall portion 223 as compared with when a peripheral surface protrusion protruding from a part of the inner peripheral surface 222a of the recessed portion 222 constitutes an upper wall portion 223A (refer to FIG. 10 described later). This enables further reducing the possibility that the stator 21 covered with the resin portion 25 comes off in the axially upward direction.

The base 22 includes a base through-hole 226 that passes through the upper wall portion 223 in an axially downward direction. The base through-hole 226 is spatially connected to the peripheral surface recessed portion 225. In the present example embodiment, a part of the resin portion 25 is accommodated in the base through-hole 226. The base through-hole 226 is filled with the resin constituting the resin portion 25. The base through-hole 226 is, for example, in a circular shape or the like in plan view in the axial direction.

Such a structure enables improvement in strength of the resin portion 25 by increasing a thickness of the resin constituting the resin portion 25 disposed axially below the upper wall portion 223, and thus enables reducing the possibility that the stator 21 covered with the resin portion 25 comes off in the axially upward direction. Such a structure also enables the base including the upper wall portion 223 to be formed by resin molding with only upper and lower molds without requiring use of a slide mold, due to the presence of the base through-hole 226, and thus enables reduction in manufacturing cost.

The base 22 is provided in its axially lower surface with a base lower surface recessed portion 227 that is recessed axially upward and that temporarily disposes a mold used for forming the resin portion 25. The base lower surface recessed portion 227 partly overlaps the base through-hole 226 when viewed in the axial direction. The overlapped portion is spatially connected to the base through-hole 226. The base lower surface recessed portion 227 may not be provided in the base 22.

Providing the base lower surface recessed portion 227 enables reducing an area in which the mold and the base 22 are in contact with each other. This enables the mold to be accurately disposed with respect to the base 22 by increasing only accuracy of a small area in which the mold and the base 22 are in contact with each other. Providing the base lower surface recessed portion 227 also enables preventing resin from protruding downward from an axially lower surface of the base 22 even when the resin leaks from the base through-hole 226 at the time of forming the resin portion 25. That is, this structure enables facilitating management of the motor 1 during manufacturing.

FIG. 8 is a view for illustrating a first modification of the motor 1 according to an example embodiment of the present disclosure. In the first modification, the base through-hole 226A has a larger area at an axially lower end position LP of an inner peripheral surface of the base through-hole 226A than at an axially upper end position UP thereof. Specifically, the inner peripheral surface of the base through-hole 226A has a larger diameter at the axially lower end position LP of an inner peripheral surface of the base through-hole 226A than at the axially upper end position UP thereof.

Such a structure enables the resin constituting the resin portion 25 filled in the base through-hole 226A to be less likely to escape from the base through-hole 226A in the axially upward direction. This enables further reducing the possibility that the stator 21 covered with the resin portion 25 comes off in the axially upward direction.

Although the present modification is configured to have a cross-sectional area perpendicular to an axial direction of the base through-hole 226A, changing only at one step in the axially downward direction, the cross-sectional area may change at two or more steps in the axially downward direction.

FIG. 9 is a view for illustrating a second modification of the motor 1 according to an example embodiment of the present disclosure. Even in the second modification, a base through-hole 226B has a larger area at an axially lower end position LP of an inner peripheral surface of the base through-hole 226B than at an axially upper end position UP thereof. Then, in the second modification, the inner peripheral surface of the base through-hole 226B includes an inclined portion 228 increasing in cross-sectional area perpendicular to an axial direction of the base through-hole 226B, in an axially downward direction. Specifically, the inclined portion 228 allows the inner peripheral surface of the base through-hole 226B to have a diameter increasing in the axially downward direction.

When the inclined portion 228 is provided, the resin to be filled in the base through-hole 226B is allowed to easily flow into an axially downward portion having a larger cross-sectional area at the time of forming the resin portion 25, as compared to the structure in which the cross-sectional area changes stepwise (refer to FIG. 8).

In the present modification, the inclined portion 228 is configured to extend from a position between an axially upper end of an inner peripheral surface of the base through-hole 228B and an axially lower end thereof to the axially lower end. However, this is an example. For example, the inclined portion 228 may be configured to extend from the axially upper end of the inner peripheral surface of the base through-hole 228B to the axially lower end thereof.

FIG. 10 is a view for illustrating a third modification of a motor according to an example embodiment of the present disclosure. An upper wall portion 223A is composed of a peripheral surface protruding portion that protrudes radially inward from an inner peripheral surface 222a of a recessed portion 222. Even in this structure, a plurality of the upper wall portions 223A may be provided along the inner peripheral surface of the recessed portion 222 in plan view in the axial direction. The upper wall portion 223A may be one upper wall portion that extends in an annular shape or a C-shape along the inner peripheral surface of the recessed portion 222 in plan view in the axial direction. Additionally, a base through-hole 226 passing through a base 22 in the axial direction is preferably provided axially below the upper wall portion 223A.

Various technical features disclosed in the present specification can be variously modified without departing from the gist of the technical creation. Additionally, the plurality of example embodiments and modifications shown in the present specification may be combined and implemented as far as possible.

The present disclosure can be used for, for example, a cooling fan for vehicles, home appliances, office equipment, and the like.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A motor comprising:
   a rotating portion that is rotatable about a center axis that extends vertically; and
   a stationary portion that rotatably supports the rotating portion;
   the stationary portion including:
      a stator facing at least a portion of the rotating portion in a radial direction;
      a base disposed axially below the stator; and
      a resin portion covering at least a portion of the stator, connecting the stator and the base;
   the base including a recessed portion that is recessed downward in an axial direction and that accommodates at least a portion of the resin portion;
   the recessed portion including an inner peripheral surface provided with an upper wall portion disposed axially above some of the portion of the resin portion;
   the resin portion is at least partially accommodated between the inner peripheral surface of the recessed portion and a portion of the base in the radial direction;

a plurality of the upper wall portions, including the upper wall portion, is provided in a direction along the inner peripheral surface of the recessed portion in a plan view viewed from the axial direction;

the inner peripheral surface of the recessed portion is continuous and defined by multiple walls which extend in different directions and corners between the walls;

at least one of the plurality of the upper wall portions is at one of the corners of the inner peripheral surface of the recessed portion in the plan view;

the base includes a base through-hole which is axially below the upper wall portion and which extends through the base in the axial direction; and a portion of the resin portion is accommodated in the base through-hole.

2. The motor according to claim 1, wherein the upper wall portion is provided at an axially upper end of the inner peripheral surface of the recessed portion.

3. The motor according to claim 1, wherein the plurality of upper wall portions includes:

a first upper wall portion; and a second upper wall portion; and when a virtual line connecting the center axis and the first upper wall portion is defined as a first virtual line, and a virtual line that is perpendicular to the first virtual line and that passes through the center axis is defined as a second virtual line, in the plan view in the axial direction, the second upper wall portion is disposed in a region opposite to a region where the first upper wall portion is disposed, across the second virtual line.

4. The motor according to claim 1, wherein the inner peripheral surface of the recessed portion is provided with a peripheral surface recessed portion that is recessed radially outward at a position below an upper end of the inner peripheral surface of the recessed portion, and that defines the upper wall portion.

5. The motor according to claim 1, wherein the base through-hole has a larger area at a position of an axially lower end of an inner peripheral surface of the base through-hole than at a position of an axially upper end of the inner peripheral surface of the base through-hole.

6. The motor according to claim 5, wherein the inner peripheral surface of the base through-hole includes an inclined portion increasing in cross-sectional area perpendicular to an axial direction of the base through-hole, in an axially downward direction.

7. A blower comprising:

the motor according to claim 1; and an impeller that is rotatable together with the rotating portion.

* * * * *